Dec. 1, 1970    J. ROBERTS    3,544,951
COUPLING WITH DEFLECTABLE ARMS
Filed June 28, 1968
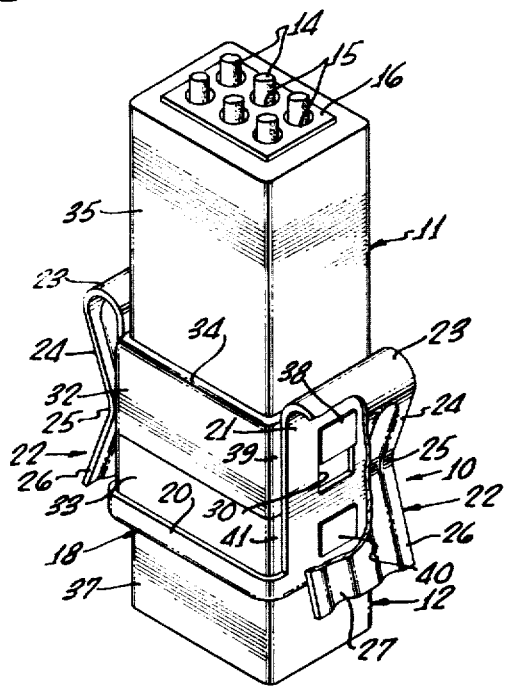
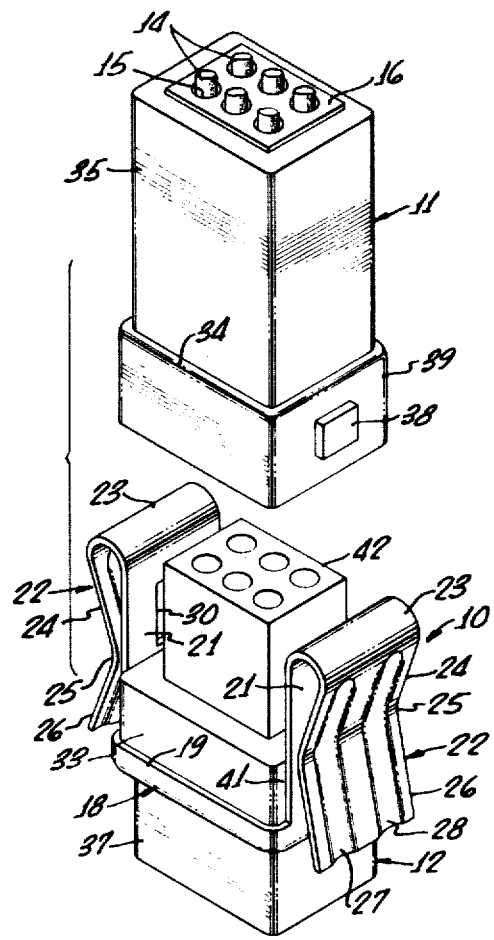
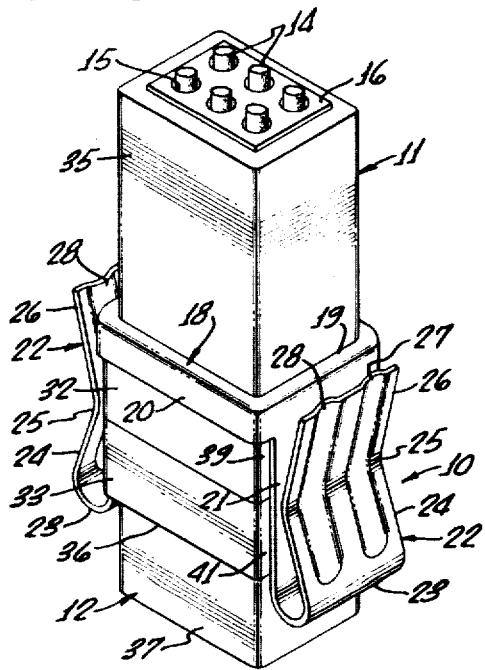
INVENTOR.
JAMES ROBERTS
BY
ATTORNEYS.

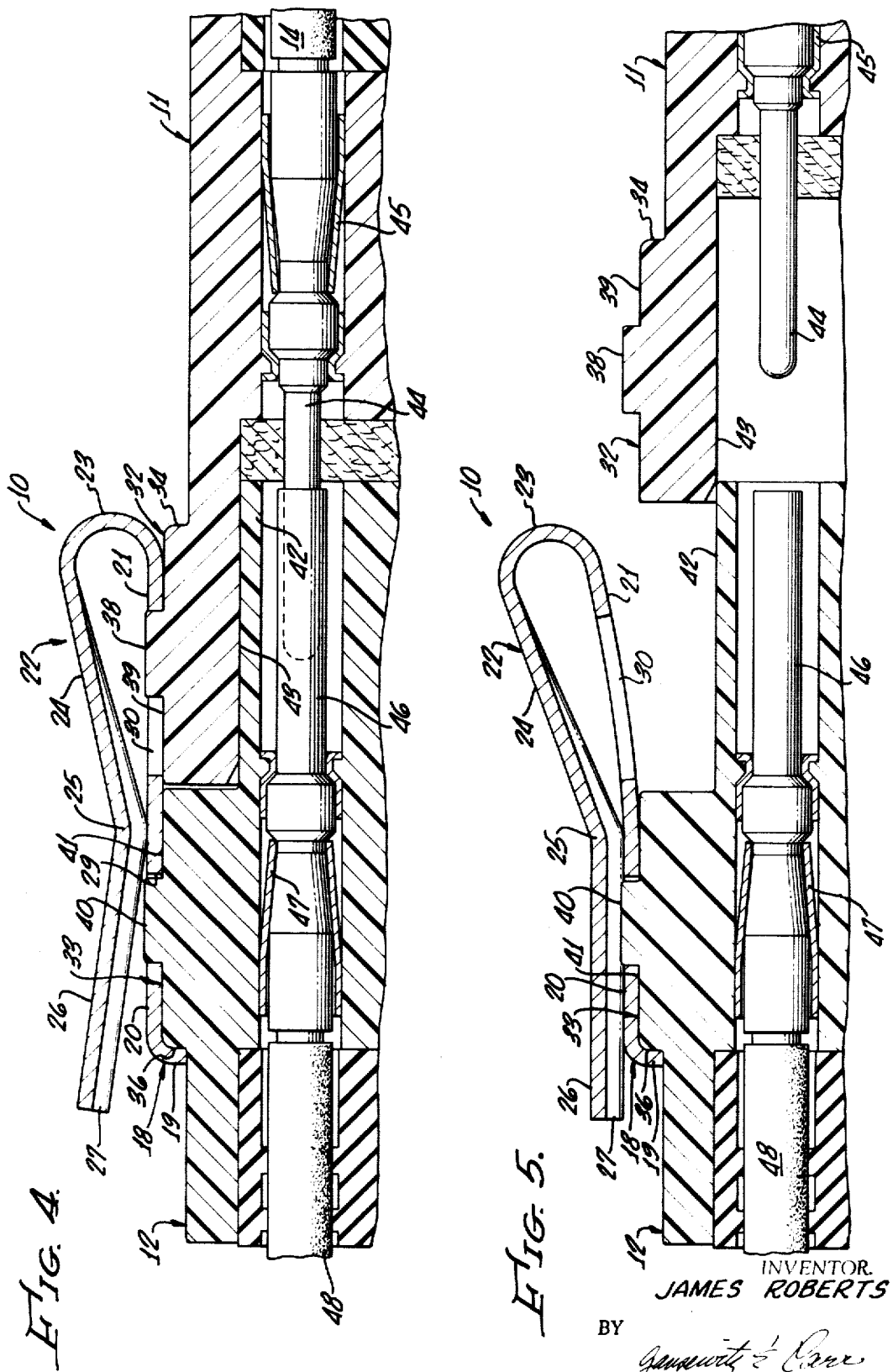

United States Patent Office

3,544,951
Patented Dec. 1, 1970

3,544,951
COUPLING WITH DEFLECTABLE ARMS
James Roberts, Banning, Calif., assignor to The Deutsch Company Electronic Components Division, Banning, Calif., a corporation of California
Filed June 28, 1968, Ser. No. 741,105
Int. Cl. H01r 13/54
U.S. Cl. 339—91　　　　　　　　　　　　　　　　　13 Claims

ABSTRACT OF THE DISCLOSURE

A coupling arrangement that includes a member having an annular portion for circumscribing one element to be connected, a pair of arms extending from the annular portion, the arms having first openings adjacent the annular portion for engaging lugs on the one element to be connected, and second openings outwardly of said first openings for engaging lugs on the other element to be connected, and including doubled-over portions extending from the outer ends of the arms to fulcrums intermediate the openings, and distal portions beyond the fulcrums, so that upon deflecting the distal portions the doubled-over portions are pivoted about the fulcrums and the arms are deflected to free the lugs from the second openings.

BACKGROUND OF THE INVENTION

Field of the invention

This invention relates to a coupling device.

The prior art

Coupling devices for electrical connectors and other uses usually are relatively complex mechanisms forming an integral part of the units with which they are associated. Generally, they include a complex grouping of links, levers or the like and, in many instances, are not readily manipulated. Furthermore, they have not had the capability of being installed selectively on either section of the mating parts to be coupled.

SUMMARY OF THE INVENTION

The present invention provides an improved simplified coupling arrangment, particularly adapted for securing together the mating sections of rectangular electrical connectors. It is not limited to this use, however, but can serve generally as a device for various purposes. It includes an annular portion that fits around one of the members to be secured, while two arms extend forwardly from this section. These arms include two pairs of opposed openings. One set of openings receives protuberances on the member around which the annular portion is extended, securing the device to that member. The ends of the arms are rounded outwardly, with a doubled over portion extending to a fulcrum at the outer surface of each of the arms and then projecting transversely outwardly and toward the annular portion of the coupling clip.

The outer ends of the arms are deflected as the mating section is advanced toward the one on which the coupling clip is installed. As this movement continues, the outer set of openings is brought into a position where it receives protuberances on the mating section, snapping into place around them when the movement is complete. Removal of one section from the other is accomplished readily by pressing inwardly on the distal ends of the doubled-over portions, causing pivotal movement about the fulcrum which deflects the ends of the arms outwardly so that they free the protuberances that have been received in their openings. The coupling clip is adapted to fit on either section of the device to be connected, being retained by the protuberances on one while removably engaging the protuberances on the other.

An object of this invention is to provide a simple, reliable and low-cost coupling device.

Another object of this invention is to provide a coupling arrangement which is easily operated to allow the coupled parts to be separated, while automatically effecting a connection as the parts are advanced toward each other.

A further object of this invention is to provide a coupling device which may be installed on either of the parts to be coupled, as described.

These and other objects will become apparent from the following detailed description taken in connection with the accompanying drawing.

BRIEF DESCRIPTION OF THE DRAWING

FIG. 1 is a perspective view of an electrical connector coupled by the arrangement of this invention;

FIG. 2 is an exploded perspective view of the connector in the separated position;

FIG. 3 is a perspective view of the coupling clip removed from the other elements of the connector;

FIG. 4 is an enlarged fragmentary longitudinal sectional view taken along line 4—4 of FIG. 1, showing the parts in the coupled position;

FIG. 5 is a view similar to FIG. 4, but with the coupling clip deflected and the parts partially separated; and FIG. 6 is a perspective view similar to FIG. 1, but with the position of the coupling clip reversed.

DESCRIPTION OF THE PREFERRED EMBODIMENT

With reference to FIG. 1 of the drawing, the coupling device 10 of this invention is shown holding together the two sections 11 and 12 of a rectangular electrical connector. Typically, the sections 11 and 12 of the electrical connector will each include a body of rigid dielectric material, within which are mounted electrical contacts that are mated when the sections of the connector are fitted together. Wires extend to the contacts within the connector so that, when the connector sections 11 and 12 are mated, the circuits of the wires are completed appropriately. In the embodiment illustrated, there are six wires 14 extending into the outer end of the connector section 11. The wires 14 extend through openings 15 in an insert 16 of resilient elastomer, such as rubber. Wires (not shown in FIG. 1) similarly extend into the opposite end of the connector section 12.

The coupling clip 10, shown removed from the other components of the connector in FIG. 3, is made of resilient sheet metal. It includes an annular portion 18, which has an inwardly extending transverse flange 19 and a longitudinal flange 20 at right angles to the flange 19. The annular portion 18 is rectangular in elevation. From the end of the flange 20 extend longitudinally directed flat arms 21. These arms are substantially parallel and in opposed relationship. Doubled-over sections 22 overlap the arms 21 and extend backwardly toward the annular portion 18. This provides rounded ends 23, which connect to portions 24 that incline inwardly to fulcrums 25 adjacent the surfaces of the members 21. From the fulcrums 25, end sections 26 incline outwardly so that at their distal ends they are spaced from the annular section 18. Longitudinally extending ribs 27 and 28 are formed in the sections 24, 25 and 26 of the coupling clip. This imparts rigidity to these sections to prevent appreciable bending of them about a transverse axis.

In the arms 21 of the coupling clip 10 are opposed rectangular openings 29 adjacent the annular portion 18. Outwardly of the openings 29 are additional opposed openings 30, which are elongated in the longitudinal direction. The openings 29 and 30 in each arm 21 are positioned such that the fulcrum 25 is between them.

The connector sections 11 and 12 include portions 32 and 33 at their inner ends, which are of increased transverse dimensions. This provides a shoulder 34 at the end of the enlarged portion 32 of the section 11 where it joins the principal body portion 35. A similar shoulder 36 is provided at the end of the enlarged portion 33 of the section 12 where the transverse dimension is reduced at the body portion 37. The shoulders 34 and 36 are annular and transverse of the sections 11 and 12. A rectangular protuberance 38 projects outwardly from either end wall 39 of the enlarged portion 32 of the connector section 11. Similar rectangular protuberances 40 are provided on the opposite end walls 41 of the connector section 12.

In use of the device, the coupling clip 10 initially is installed on either the section 11 or 12, as desired. In the embodiment of FIGS. 1, 2, 4 and 5, the coupling clip 10 is mounted on the connector section 12 prior to the mating of the two connector sections. In accomplishing this, the annular portion 18 of the coupling clip 10 is slid over the body portion 37 and advanced to the shoulder 36. The coupling clip is dimensioned so that the flange 20 fits around the enlarged portion 33 in a generally complementary fashion. The flange 19 of the annular section 18 is brought into adjacency with the shoulder 36 of the enlarged section 33, while the inner edge of this flange circumscribes the body portion 37. When this is done, the protuberances 40 on the end walls 41 of the connector section 12 are received in the opposed rectangular openings 29 in the forwardly extending arms 21. As the connector clip 10 is moved onto the connector section 12, the arms 21 may be deflected readily to allow them to pass over the protuberances 40 and permit the connector clip 10 then to snap into place. Therefore, the arms 21 and the protuberances 40, which act as lugs, as well as the shoulder 36 and the flange 19 cooperate to firmly position the coupling clip 10 on the connector section 12.

In the design illustrated, the connector section 12 includes an inner central portion 42 of reduced length and width dimension, which is received within a generally complementary cavity 43 in the section 11 when the connector is in the secured position (see FIG. 4). When this takes place, the pin contacts 44, held in the section 11 by retainer clips 45, extend into the socket contacts 46, which are mounted in the section 12 by similar retainer clips 47. This creates electrical circuits between the wires 14 that enter the section 11 and extend to the pin contacts 44, and the wires 48 which extend into the connector section 12 and are received in the socket contacts 46.

As the connector sections 11 and 12 are moved into the mated position, the arms 21 slide over the end walls 39 of the connector section 11. As the movement progresses, the rounded ends 23 engage the rectangular protuberances, or lugs, 38 on the end walls 39. By virtue of their rounded contour, the ends 23 provide outwardly inclined surfaces adjacent the protuberances 38, so that the arms 21 are deflected outwardly by the protuberances 38. This allows the connector sections 11 and 12 to move relatively toward each other without interference. When the connector sections 11 and 12 are in the fully mated position, the protuberances 38 enter the opposed openings 30 in the arms 21. This allows the arms 21 to snap inwardly against the end walls 39 of the connector section 11. As a result, the connector clip 10, cooperating with the protuberances 38, holds the connector section 11 firmly to the connector section 12, so that the connector will not become separated and the circuit between the wires 14 and 48 will be maintained.

When the connector sections 11 and 12 are to be separated, the arms 21 are deflected outwardly away from the protuberances 40 to free the section 11 from the section 12 of the connector. This is accomplished readily by pressing inwardly on the end positions 26 of the coupling clip 10, as indicated in FIG. 5. When this is done, the outer end portions of the arms 21 beyond the point of contact at the fulcrum portion 25 are pried outwardly and away from the protuberances 40. This occurs as the doubled-over sections 22 pivot about the fulcrums 25, so that the inward movement of the portions 26 causes outward movement of the portions 24. The latter movement causes the outer ends of the arms 21 also to be moved outwardly so that the protuberances 38 are freed. The ribs 27 and 28 assure that the sections 24, 25 and 26 will not experience appreciable deflection, while the flat arm portions 21 will readily be bent outwardly. The inner portions of the arms 21, adjacent the openings 29, will not be deflected because of the location of the fulcrums 25 between the openings 29 and 30. Thus, it is very simple to disconnect the connector mereby by pressing inwardly on the two outer portions 26 of the coupling clip 10 and sliding one connector section longitudinally away from the other.

The coupling clip 10 can be installed on the connector section 11, rather than the section 12, as desired. This is illustrated in FIG. 6. There, the annular section 18 circumscribes the outer end portion of the enlarged section 32 of the connector section 11. The protuberances on the end walls 39 are received in the opposed rectangular openings 29, while the flange 19 of the section 18 of the coupling clip 10 is brought into adjacency with the shoulder 34 of the connector section 11. The action of the coupling and uncoupling of the connector is similiar, regardless of which section the coupling clip 10 is installed upon. Thus, when on the section 11, the rounded ends 23 are deflected by the protuberances 40 which enter the elongated openings 30 as the connector sections are moved into their fully mated positions. Removal, again, is obtained by bending the portions 26 inwardly to deflect the arms 21 outwardly to free the protuberances 40 from the openings 30.

I claim:

1. In combination with a first element and a second element, a device for coupling said first element to said second element comprising
    an annular member adapted to circumscribe one element to be connected,
    a duality of arms projecting from said annular member, each of said arms including means for engaging and holding the other element to be coupled,
    means for retaining said annular member on said one element to be connected,
    and an overlapping portion integral with and extending inwardly from the outer end of each of said arms so as to overlap said arms adjacent said outer ends,
        each overlapping portion including a fulcrum part, said fulcrum parts being adjacent and engageable with said arms,
        and a distal portion beyond said fulcrum part, whereby when said distal portions are deflected said overlapping portions are caused to pivot about said fulcrum parts to deflect said arms outwardly for releasing said other element.

2. A device as recited in claim 1 in which each overlapping portion inclines inwardly to said fulcrum part thereof, and said distal portion inclines outwardly from said fulcrum part.

3. A device as recited in claim 1 in which said overlapping portions include outwardly inclined portions at the outer ends of said arms for allowing deflection of said arms upon engagement with said other element to be coupled.

4. A device as recited in claim 1 including in addition rib means on said overlapping portions for imparting rigidity thereto.

5. A device as recited in claim 1 in which said annulur member includes a transverse flange at the end thereof opposite from said arms for engaging a shoulder on said one element to be connected.

6. A device as recited in claim 1 in which said means for engaging and holding said other element to be coupled includes an opening in each of said arms, said other element to be coupled including an outwardly projecting lug received in each of said openings.

7. A device as recited in claim 6 in which said arms include additional openings inwardly of said first-mentioned openings, said one element to be coupled having a lug received in each of said additional openings for providing said means for retaining said annulur member to said one element to be coupled.

8. A device as recited in claim 7 in which said fulcrum part of each of said overlapping portions is positioned intermediate said first-mentioned opening and said additional opening of the said arms adjacent thereto.

9. In combination with a duality of elements to be coupled, each of said elements having a duality of outwardly projecting lug means thereon, a device for coupling said elements comprising a sheet metal member,
said member having an annular portion adjacent one end thereof,
a duality of arms extending from said annular portion,
said member having a duality of first apertures adjacent said one end for selectively engaging the lug means of said elements for thereby securing said member to either of said elements,
each of said arms having a second aperture, said second apertures being outwardly of said first apertures for engaging the lug means of the other of said elements for thereby securing said other element to the element with which said member is associated,
and a doubled-over portion extending from the outer end of each of said arms,
each doubled-over portion including an outwardly inclined section adjacent said outer end of the arm with which it is associated for causing said arms to be deflected outwardly upon engagement of said sections with said lug means,
said doubled-over portions each including a fulcrum portion adjacent the arm with which it is associated intermediate said first and second apertures,
and a distal portion outwardly of said fulcrum portion,
whereby upon deflecting said distal portions said arms are pried outwardly beyond said fulcrum portions,
thereby removing said lug means of said other element from said second apertures and permitting separation of said elements.

10. A device as recited in claim 9 in which said annular portion includes a transverse flange, and in which each of said elements to be coupled includes an annular shoulder engageable by said transverse flange when sail annular portion is associated with said element and said lug means thereof are in said first apertures.

11. A device as recited in claim 9 in which for said outwardly inclined end sections said doubled-over portions include rounded ends connecting to said arms.

12. A device as recited in claim 11 in which said doubled-over portions incline inwardly toward said arms from said rounded ends to said fulcrum portions, and said distal portions incline outwardly away from said fulcrum portions.

13. A device as recited in claim 12 in which said inclined portions of said doubled-over portions are provided with ribs for thereby increasing the rigidity thereof for minimizing the bending of said doubled-over portions upon said deflecting of said distal portions.

References Cited

UNITED STATES PATENTS

| 1,835,251 | 12/1931 | Wetstein | 339—91 |
| 2,194,769 | 3/1940 | Reed | 339—91 |
| 2,760,174 | 8/1956 | Burtt et al. | 339—91 |
| 3,383,639 | 5/1968 | Anderson et al. | 339—75 |

MARVIN A. CHAMPION, Primary Examiner

J. H. McGLYNN, Assistant Examiner

U.S. Cl. X.R.

287—110